(12) United States Patent
Leigh

(10) Patent No.: US 9,609,466 B2
(45) Date of Patent: Mar. 28, 2017

(54) GUIDE SEGMENT IDENTIFICATION

(71) Applicant: Hewlett-Packard Development Company, L.P., Houston, TX (US)

(72) Inventor: Kevin B Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/787,353

(22) PCT Filed: Jun. 17, 2013

(86) PCT No.: PCT/US2013/046141
§ 371 (c)(1),
(2) Date: Oct. 27, 2015

(87) PCT Pub. No.: WO2014/204432
PCT Pub. Date: Dec. 24, 2014

(65) Prior Publication Data
US 2016/0142864 A1    May 19, 2016

(51) Int. Cl.
*H04B 5/00*    (2006.01)
*H04B 7/00*    (2006.01)
*H04W 4/00*    (2009.01)
*G06K 19/07*    (2006.01)
*G06K 19/077*    (2006.01)
*G06K 17/00*    (2006.01)

(52) U.S. Cl.
CPC ........ *H04W 4/008* (2013.01); *G06K 19/0723* (2013.01); *G06K 19/0776* (2013.01); *G06K 19/07758* (2013.01); *G06K 2017/0045* (2013.01)

(58) Field of Classification Search
CPC .................................................. H04W 4/008
USPC ............................................. 455/41.2, 41.1
See application file for complete search history.

(56) References Cited

U.S. PATENT DOCUMENTS

| | | | |
|---|---|---|---|
| 7,436,303 B2 | 10/2008 | Tourrilhes | |
| 7,561,717 B2 * | 7/2009 | Anderson | G06K 17/0022 235/462.13 |
| 7,667,855 B2 * | 2/2010 | Piazza | G01S 5/16 340/13.26 |
| 7,961,722 B1 * | 6/2011 | Jankowski | G06F 9/46 370/381 |

(Continued)

FOREIGN PATENT DOCUMENTS

TW    I387869 B1    3/2013

OTHER PUBLICATIONS

Cram, M.; Data Center Power Blog; http://info.servertech.com/blog/bid/126321/Cram-IT-The-Role-of-RF-in-Data-Center-Power-Management >; May 16, 2012.

(Continued)

*Primary Examiner* — Tilahun B Gesesse
(74) *Attorney, Agent, or Firm* — Hewlett Packard Enterprise Patent Department

(57) ABSTRACT

An identification apparatus is provided herein. The identification apparatus may include an identification mechanism coupled to a first guide segment and a reader mechanism coupled to second guide segment. The reader mechanism may receive a set of data of the identification mechanism via a proximity connectivity method. The reader mechanism may communicate the set of data to a controller.

15 Claims, 6 Drawing Sheets

(56) References Cited

U.S. PATENT DOCUMENTS

| | | | |
|---|---|---|---|
| 8,164,453 B2* | 4/2012 | Wang | G06K 17/00 |
| | | | 235/375 |
| 8,264,354 B2* | 9/2012 | Groth | G06Q 10/087 |
| | | | 340/539.1 |
| 9,224,124 B2* | 12/2015 | Rahim | G06F 19/30 |
| 2004/0178269 A1* | 9/2004 | Pradhan | G01S 13/74 |
| | | | 235/462.13 |
| 2006/0135843 A1* | 6/2006 | Heath | A61N 5/1007 |
| | | | 600/7 |
| 2009/0085744 A1 | 4/2009 | Sellin | |
| 2009/0108995 A1 | 4/2009 | Tucker | |
| 2011/0026527 A1 | 2/2011 | Shao | |
| 2011/0150472 A1 | 6/2011 | Davidson et al. | |
| 2011/0188417 A1 | 8/2011 | Pettus et al. | |
| 2011/0243074 A1 | 10/2011 | Shin et al. | |
| 2012/0215902 A1 | 8/2012 | DeCusatis et al. | |
| 2013/0014254 A1 | 1/2013 | Gladwin et al. | |

OTHER PUBLICATIONS

Halperin, D. et al.; Augmenting Data Center Networks with Multi-gigabit Wireless Links; http://research.microsoft.com/pubs/157700/flyways_sigcomm11.pdf >; Aug. 15-19, 2011.
ISA/KR, International Search Report dated Mar. 25, 2014, PCT/US2013/046141 filed Jun. 17, 2013.

\* cited by examiner

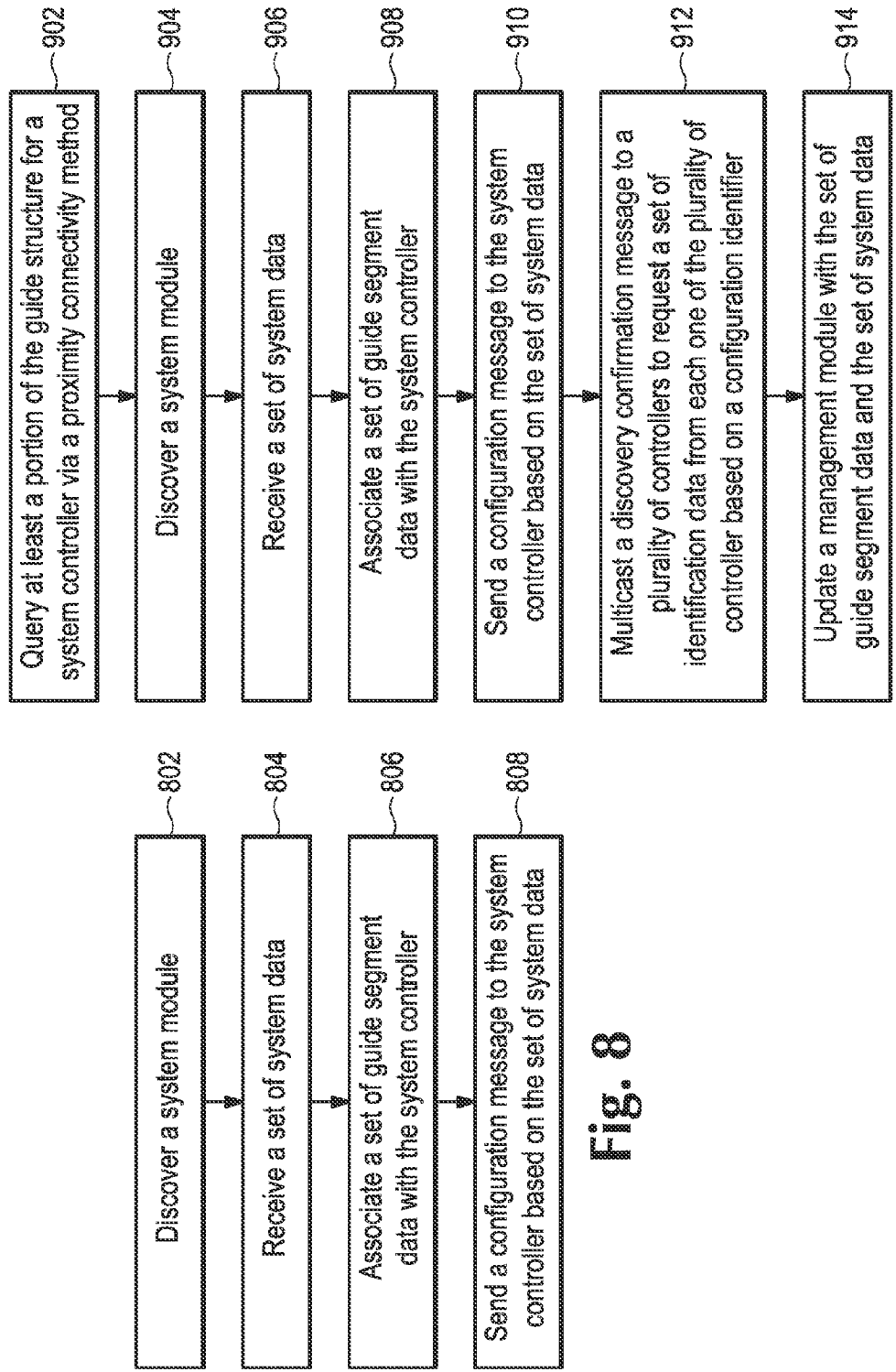

GUIDE SEGMENT IDENTIFICATION

BACKGROUND

Computers are able to communicate with other computers over a network. Server systems may be connected to the network via network devices, such as one or more network switches, to provide services to computers and other devices connected to the network. Some server systems may be made of multiple machines and/or virtual machines and may be referred to as a server farm where a server room may be dedicated to store the machines of the server farm. The server room may contain rows and columns of machines and devices dedicated to providing a service or set of services.

Electrical and/or optical cables are commonly used to connect multiple machines and/or systems to the network devices and connect network devices to other network devices. Cable connections may be created between systems and/or network interconnection devices as the systems and/or devices are added to the server side of the network. The quantity of cables may be organized by a cabling system and the cabling system may become complex as machines are added to the server farm to provide the desired level of availability of the service. It may also be difficult to find particular servers or network devices as the server farm increases in size.

BRIEF DESCRIPTION OF THE DRAWINGS

FIGS. 8 and 9 are flow diagrams of examples of identification methods for maintaining a topology of a plurality of system modules.

DETAILED DESCRIPTION

In the following description and figures, some example implementations of identification apparatus, systems and/or methods are described. Server systems are commonly grouped in racks where there may be multiple racks in a single server room. The server systems may be cabled to network switches and/or other devices and racks may be physically connected to other racks. Cables may be electrical or optical. Physically cabled networks may be difficult to install, manage, and scale. Server systems may adapt to increasing network connections by adding a server system, network switch, and/or a rack of servers and associated structure and hardware. When hardware fails or is otherwise replaced, the hardware may be located within a server room of a relatively large number of server systems and multiple racks.

Wireless networks provide communication among devices, whether among computers, between a computer and a server system or among server systems, without cables by providing signal transmission over antenna. Wireless networks, however, are susceptible to security threats from devices within range of a wireless signal transmission. A wireless signal may be difficult to be transmitted from within a metal enclosure. A wireless signal may be directed to a specific area by using a guide made of a material that may hinder emission of the signal outside of the guide. This may provide protection from security threats by limiting the signal in an area contained by the guide while allowing the signal to be transmitted across metal enclosures. A wireless connection of hardware to a network over a wireless communication protocol may create difficulty in locating a failed device or otherwise finding a device determined to be replaced or moved.

Figure 1:
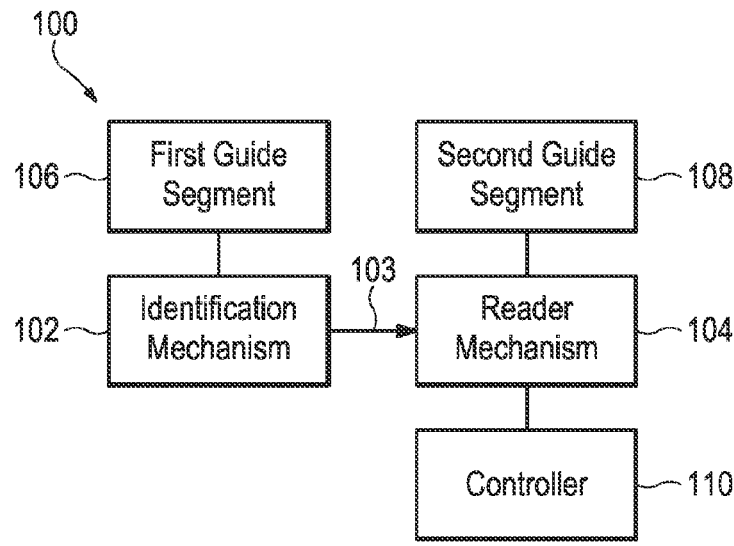
FIGS. 1 and 2 are block diagrams of examples of identification apparatus to communicate with a controller.

FIG. 1 is a block diagram of one example of an identification apparatus 100. Referring to FIG. 1, one example identification apparatus 100 may generally comprise an identification mechanism 102 coupled to a first guide segment 106 and a reader mechanism 104 coupled to a second guide segment 108. The reader mechanism 104 may read the information of the identification mechanism 102. For example, the reader mechanism 104 may receive the information from the identification mechanism 102 via a proximity connectivity method, such as radio frequency identification ("RFID"), near field communication ("NFC"), or wireless personal area network ("WPAN"). The guide segments 106 and 108 may guide a signal within a network to a device or module. The module may be coupled to a management controller 110.

The identification mechanism 102 may include an identification tag to contain a set of data representing information associated with the guide segment 106. The set of data may include a unique identifier, information that identifies the specific guide segment, such as a serial number, a model number, manufacturer information, version information, manufacturing date, etc., configuration information, and/or location information. Configuration information may include the signal frequency, data rate, modulation, method supported, etc. The identification mechanism and/or identification tag may include an antenna, a transmitter, a receiver, circuitry, and/or memory to electronically store the data. The identification tag may be read-only, write-once or generally be read/write capable. The identification tag may be preprogrammed, programmed during tag installation, programmed after installation, or programmed during operation.

The identification tag may be a passive or active tag. An active identification tag may constantly, periodically, or intermittently transmit the identification signal and may include a power source to power the active transmissions. A passive identification tag may use the reader mechanism 104 as an energy source to transmit the data.

The reader mechanism 104 may receive a transmission, such as signal 103, containing the set of data via a proximity connectivity method. The reader mechanism 104 may include an antenna, a transmitter, a receiver, a sensor, circuitry, and/or a transceiver to communicate with a controller 110. The reader mechanism 104 may be configured based on the configuration of the identification mechanism 102. For an active configuration example, the identification mechanism 102 may send a signal to the reader mechanism 104 and the reader mechanism 104 may read the response signal 103 including the set of data of the identification mechanism 102. For a passive configuration example, the reader mechanism 104 may read an unpowered identification tag of the identification mechanism 102 by transmitting energy to the identification tag by magnetically inducing current in the identification tag to provide power to transmit a response signal 103 via RFID. The reader mechanism 104 may be configured based on the proximity connectivity method. For example, the response signal 103 may be sent via NEC upon abutting the guide segment 106 with the guide segment 108 or connecting them through a guide connector, such as guide connector 310 in FIG. 3A.

The reader mechanism 104 may communicate the data to a controller 110. Controller 110 may be a management controller associated with the system, rack, row, and/or other management level. The controller 110 may be a subsystem with circuitry and/or programming capabilities to manage the operation of the system and communicate with other controllers connected to the network to provide location services. The network of controllers may centralize network management, administer a distributed system, and/or perform other system management asks, such as hardware inventory, server and network capacity monitoring, and security management, in addition to providing location services as described herein.

The proximity connectivity method may be any method of wireless communication between two devices within a determined range. Forms of proximity connectivity methods for communication between devices in relatively short proximity may include RFID; NFC; WPAN, such as BLUETOOTH wireless technology; or a combination of proximity connectivity methods. A proximity connectivity method may be chosen based on the determined range of the identification mechanism 102 with respect to the reader mechanism 104, the data rate, and/or the configuration of the identification apparatus 100. The range of available of the proximity connectivity method may be a range from a less than one centimeter to a few meters based on the selected proximity connectivity method. The proximity connectivity method may be passive, where the identification tag may only provide information upon request from a reader mechanism, or active, where the identification tag may emit a tag signal constantly, periodically, or intermittently to be received by a reader mechanism when the reader mechanism is within range of emission of the tag signal.

The guide segments 106 and 108 may be waveguides that are able to guide a signal in a communication path of a network. The waveguides may provide at least a portion of a communication path of a radio frequency ("RF") network via air or conductor. Alternatively, guide segments 106 and 108 may provide containment for optical fibers. The first guide segment 106 and the second guide segment 108 may be connected by a guide connector, such as guide connector 310 in FIG. 3A, that may align the communication path. The guide segment 106 may include a portion of the system module that is in communication with or otherwise coupled to be other guide segment 108.

Figure 2:
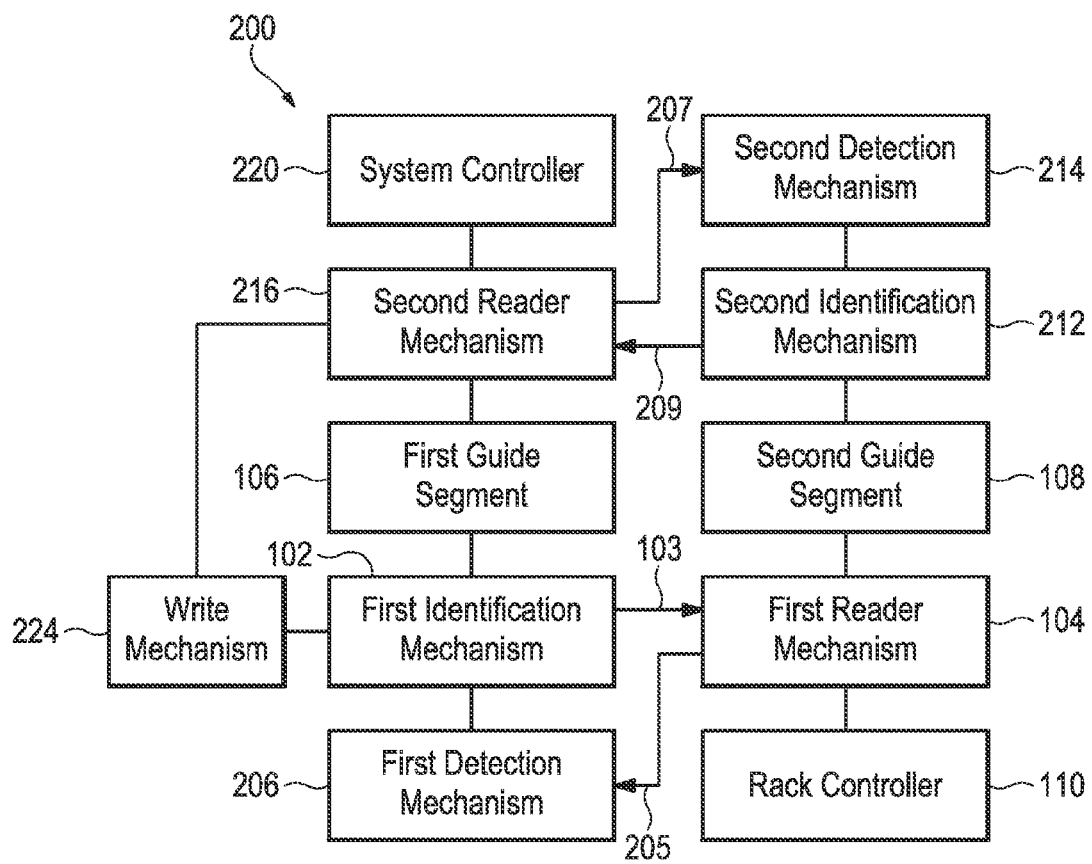

FIG. 2 is a block diagram of one example of an identification apparatus 200. Referring to FIG. 2, one example identification apparatus 200 may generally comprise a first guide segment 106, a second guide segment 108, a first identification mechanism 102, a second identification mechanism 212, a first reader mechanism 104, and a second reader mechanism 216. This example identification apparatus 200 may provide bi-directional communication of guide segment information.

The first guide segment 106 and the second guide segment 108 may be guide segments of a guide structure to provide a communication network. The communication network may be modularized into rows, cabinets, racks, system, subsystem or other levels, as desired. The rack level of the communication network may contain multiple systems. A cabinet level may contain multiple racks. The row level of the communication network may connect to each cabinet and/or racks. The communication network may create a network of free space, one or more conductors within the guide structure, and/or a combination thereof. For example, a conductor may include a coaxial cable. The communication network may communicate using one or more RF protocols. Alternatively, the communication network may communicate over optical fibers.

The first identification mechanism 102 and the second identification mechanism 212 may each include a detection mechanism to facilitate communication of the set of data. For example, the identification mechanisms 102 and 212 may be active in transmitting signals using the detection mechanism. The first detection mechanism 206 and the second detection mechanism 214 may include a sensor. The sensor may detect a signal 205 when a reader mechanism, such as the reader mechanism 104 or 216, is in range of the identification mechanism 102 or 212 based on a proximity connectivity method. Multiple detection mechanisms may exist at designated intervals substantially along a linear path on the exterior or interior of the guide segments.

A first detection mechanism 206 may be coupled to the first identification mechanism 102. Upon detecting the detect signal 205 by detection mechanism 206, identification mechanism 102 may send a signal 103 containing a set of data representing information of guide segment 106 to the reader mechanism 104. The reader mechanism 104 may read the signal 103 containing the data associated with the guide segment 106. Similarly, a second detection mechanism 214 may be coupled to the guide segment 108 and may detect a second detect signal 207 from reader mechanism 216, identification mechanism 212 may send a signal 209 containing a set of data representing information of the guide segment 108 to reader mechanism 216, and reader mechanism 216 may read the signal 209 containing the data associated with the guide segment 108.

The first reader mechanism 104 may be coupled to a rack controller 110 and the second reader mechanism 216 may be coupled to a system controller 220. The first reader mechanism 104 may relay the data of the first guide segment 106 to rack controller 110 and the second reader mechanism 216 may relay the data of the second guide segment 108 to system controller 220.

A write mechanism 224 may be coupled to the identification mechanism 102 and in communication with the reader mechanism 216. If the signal 209 contains a set of write data, the reader mechanism 216 may pass that request onto the write mechanism 224. The write mechanism 224 may update the identification mechanism 102 with the set of write data. The set of write data may contain information associated with guide segments, bay area, group, rack, or other location information.

Figure 3A:
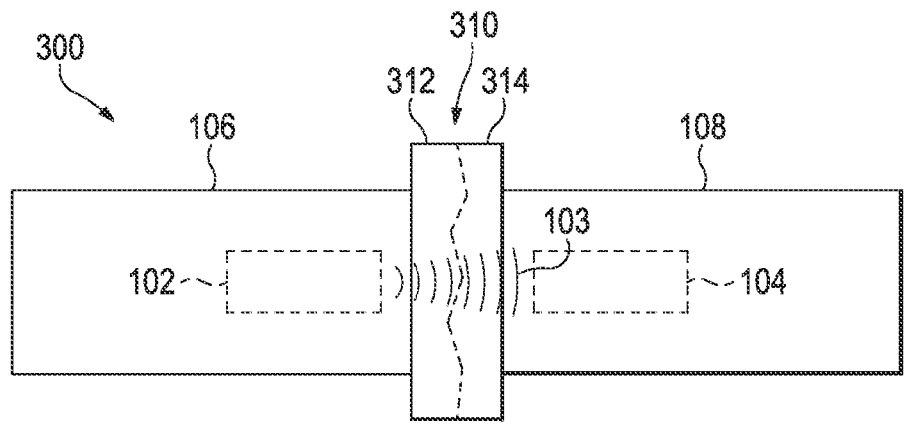
FIG. 3A is a side view of one example of an identification apparatus to communicate with a controller.
Figure 3B:
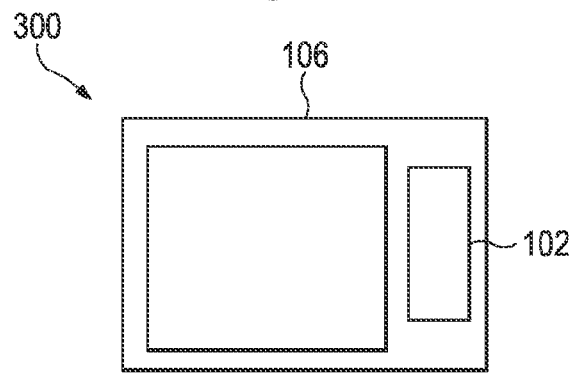
FIG. 3B is a cross-sectional view of one example of an identification apparatus to communicate with a controller.
Figure 4:
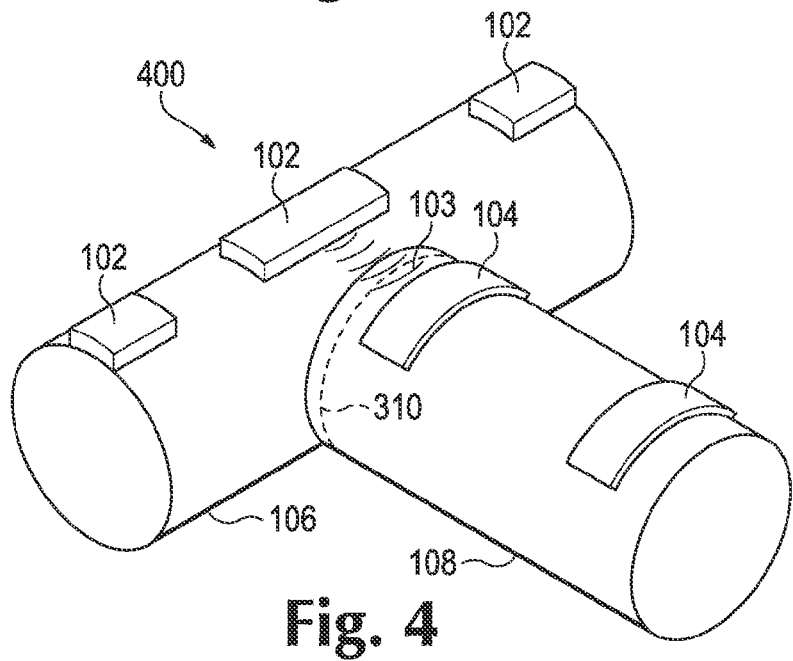
FIG. 4 is a perspective view of one example of an identification apparatus to communicate with a controller.

FIGS. 3A, 3B, and 4 are views of examples of identification apparatus 300 and 400. Referring to FIGS. 3A and 3B, one example identification apparatus 300 generally comprises an identification mechanism 102 coupled to a first guide segment 106 and a reader mechanism 104 coupled to second guide segment 108.

The identification mechanism 102 may be integrated into the first guide segment 106 as shown in FIG. 3B or may be attachable to the first guide segment 106 as shown in FIG. 4. For example, the identification mechanism 102 may include an RFID tag that is pliable and has an adhesive coating on one side that may be applied to a surface of the first guide segment 106. The reader mechanism 104 may be integrated into the second guide segment 108 or may be attachable to the second guide segment 108. The identification mechanism 102 may be placed on the guide segment 106 relative to the placement of the reader mechanism 104 on the second guide segment 108 to be within the range of a proximity connectivity method used between the identification mechanism 102 and the reader mechanism 104 to transmit signal 103.

Guide segments 106 and 108 may be structured to implement a guide structure and a communication network. Guide segments 106 and 108 may guide a RE signal via the free space within the guide segments 106 and 108 or via the guide segments 106 and 108 as a conductor. For example, the guide segments 106 and 108 may propagate a RF signal with a specific frequency in both directions through a hollow portion of the guide segment 106 and 108; the guide segments 106 and 108 may have a rectangular cross-section having a width-to-length ratio of walls related to the specific frequency of the RF signal to reflect the signal in a manner to propagate the RF signal through the guide segment 106 and/or 108 with losing relatively small amounts of power. Guide segments 106 and 108 may be any geometry that propagates the signal, such as a rectangular geometry mentioned above and shown in FIG. 3B or an elliptical geometry as shown in FIG. 4. One example rectangular geometry may have a height-to-width ratio of 1 to 2. Guide segments 106 and 108 may be made of material to propagate the signal, may have a metalized inner coating, and/or may be conductive. For example, the guide segment 108 may be made of copper with jacket or the guide segment 108 may be made of plastic with a copper coating on the interior of the guide segment 108. The jacket may provide shielding and/or insulation to contain the RF signal. Guide segments 106 and 108 may be made of metal. Guide segments 106 and 108 may be integrated within a support structure to hold server systems, such as a server rack shown in FIG. 6, or may be attachable to the support structure.

Guide segments 106 and 108 may be coupled by a guide segment connector 310 to provide a communication path between the guide segments 106 and 108. The guide segment connector 310 may connect guide segments 106 and 108 to place the reader mechanism 104 within a range to receive data from the identification mechanism 102 based on a selected proximity connectivity method. The guide segment connector 310 may provide connections between free space and/or one or more conductors of the guide segments 106 and 108 to allow a transmission to continue between guide segments 106 and 108.

The guide connector 310 may provide manual-mating or blind-mating between guide segments 106 and 108. For example, the guide connector 310 may consist of two pieces, where a first piece 312 is connected or integrated to the first guide segment 106 and the second piece 314 is connected or integrated to the second guide segment 108. The first piece 312 may have a surface complementary to a surface on the second piece 314 to facilitate connecting the guide segments 106 and 108 together. Complementary surfaces may be one way to provide a self-alignment feature for manual-mating or blind-mating guide segments 106 and 108. A "blind-mate connection" refers to connection in which one device is precisely aligned with respect to another device, by the simple action of inserting an assembly containing the blind mateable device into a second assembly. Precision alignment between the devices is achieved automatically through the use of mating alignment structures, so that human vision in not involved for aligning the devices to make the connection.

Referring to FIG. 4, one example identification apparatus 400 may generally comprise at least one identification mechanism 102 coupled to a guide segment 106 and at least one reader mechanism 104 coupled to another guide segment 108.

The guide segment 106 may have one or more identification mechanisms 102 capable of detecting and/or transmitting a signal, such as signal 103, and containing information to be received by the reader mechanisms 104. The one or more identification mechanisms 102 may be placed at designated intervals substantially along a linear path of the guide segment 106 or otherwise placed on the guide segment 106. The guide segment 108 may have one or more reader mechanisms 104 capable of reading the one or more identification mechanisms 102. The one or more reader mechanisms 104 may be placed at designated intervals substantially along a linear path of the second guide segment 108 or otherwise placed on the second guide segment 108.

Figure 5:
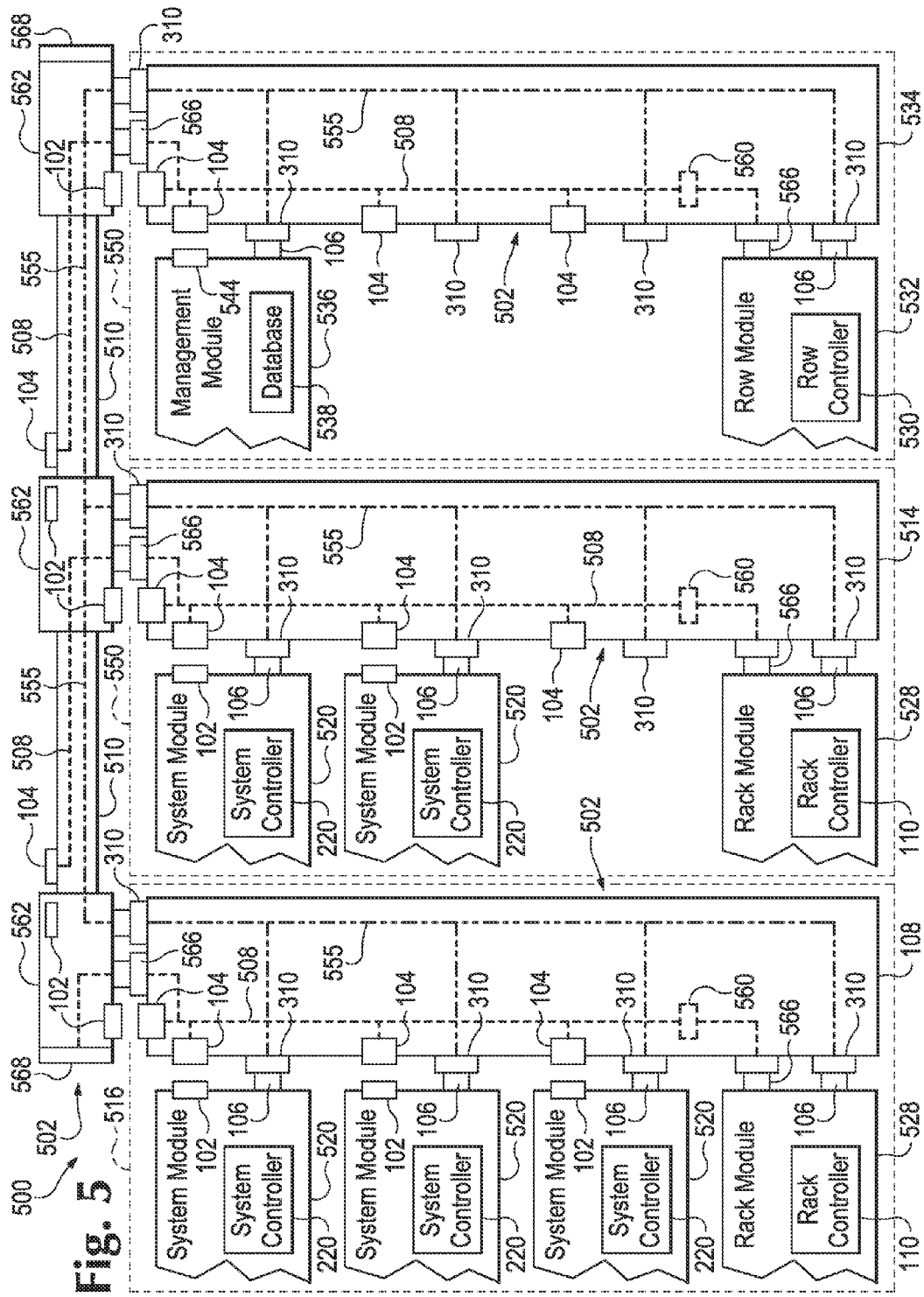
FIG. 5 is a block diagram of one example of an identification system to communicate with a controller.

FIG. 5 is a block diagram of one example of an identification system 500. Referring to FIG. 5, one example identification system 500 may generally comprise a guide structure 502, at least one identification mechanism 102, a plurality of reader mechanisms 104, and at least one communication interface network 508.

The guide structure 502 may provide a communication network for devices communicatively coupled to the guide structure 502. The guide structure 502 may provide one or more communication paths 555 for transmissions among devices. Device transmissions may be signals that move along one or more of the communication paths 555. Signals may travel along a communication path 555 via free space within the guide structure 502 or one or more conductors in the guide structure 502. For example, the guide structure 502 may allow RF signals to travel substantially along a free space communication path 555 of the guide structure 502. Alternatively, the guide segments of the guide structure 502 may be made of a metal conductor within a jacket to transfer an RF signal along communication path 555. The guide structure 502 may provide one or more communication networks comprising one or more communication paths 555 based on the configuration of the devices connected to the guide structure 502 and/or the destination and source of the communication. For example, devices connected to one guide segment may communicate over one network while devices connected to another guide segment may communicate over another network.

The guide structure 502 may comprise multiple guide segments. For example, the guide structure 502 may include a row segment 510, a rack segment 108, and a system segment 106. The guide structure 502 may also include guide connections, such as guide connectors 310 and guide joints 562. As depicted in FIG. 5, the guide structure 502 may include guide segments 106, 108, 510, 514, 534, and 540 and guide connections 310 and 562. Each portion of the guide structure 502 may include an antenna to communicate and/or initiate communication with other portions of the guide structure 502.

The rack segment 108 may connect to the row segment 510 via a guide connector 310 that allows for a signal to travel between the rack segment 108 and row segment 510. The rack segment 108 may connect to other guide segments, such as the guide connector 310, guide joint 562 and the system segment 106 coupled to one of system modules 520. Segments designated as rack-level segments, such as segments 108, 514, and 534, may have one or more connections to row-level segments, such as segments 510, 540, and 562 depending on implementation. For example in FIG. 5, rack segment 534 may have a guide connection 310 for communication with the communication path 555, a wireless connection between the identification mechanism 102 and the reader mechanism 104, and a direct electrical interface connection 566 in communication with the communication interface network 508.

The row segment 510 may be connected to or in communication with other rack segments, such as rack segment 514. The row segment 510, via the guide joint 562, may have one or more direct connections for communication, such as connections 310 and 566, with the rack segment 514 and/or one or more wireless connections, such as the communication between the identification mechanism a 102 and the reader mechanism 104, with the rack segment 514. The row segment 510 may include an antenna to detect connection and/or communication with the rack segment 514. The antenna may be in communication with the communication paths 555.

The row segment 510 may be connected to or in communication with other row segments, such as row segment 540 and/or the guide joint 562. The row segments 510 and 540 may include a reader mechanism 104 to be in communication with an identification mechanism 102 associated with the guide joint 562 to communicate with an adjacent row and/or the communication interface network 508. For example, the row controller 530 may discover the rack 550 by receiving data such as a set of guide segment or other information associated with the rack 550, from the identification mechanism 102 connected to guide joint 562 using the reader mechanism 104 associated with the row segment 540; the reader mechanism 104 may communicate the received data to the row controller 530 over electrical interface connection 566 and the communication interface network 508. The rack controller 110 may request to write a set of data associated with rack 550 onto the identification tag 102. The reader mechanism 104 associated with the row segment 540 may read the information contained on identification tag of the identification mechanism 102 associated with the guide joint 562.

The row segment 510 may include an antenna to communicate to other row segments, such as row segments 562 or 540, rack segments, and/or their controllers. For example, the row segment 540 may be able to communicate with the adjacent guide joint 562, connected to the rack segment 514, over an antenna communication near a point of connection. Once the row segment 540 initiates the connection and discovers the adjacent guide joint 562, the row controller 530 may communicate over a portion of the communication paths 555 associated with the adjacent row segment 510.

Figure 6:
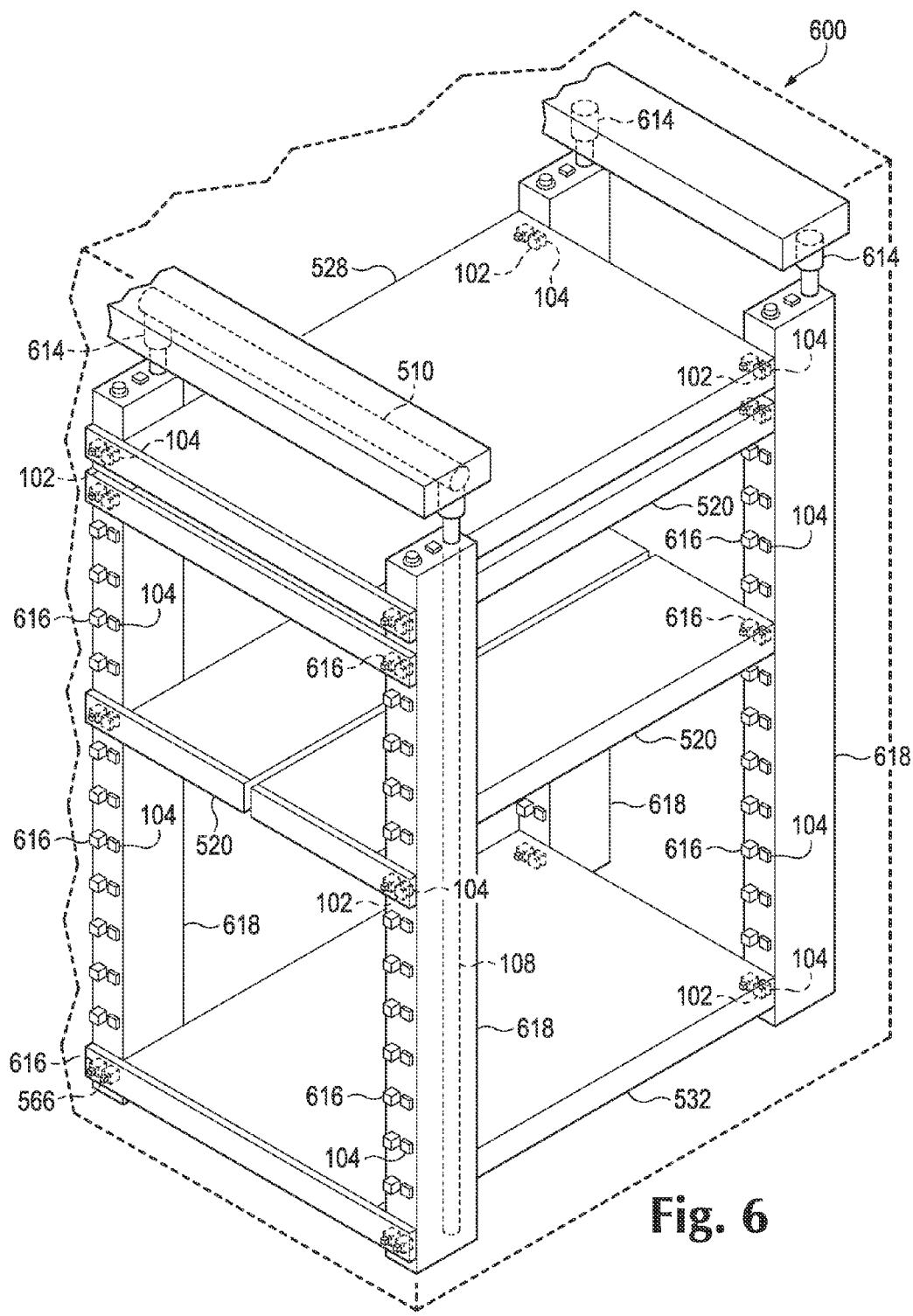
FIG. 6 is a perspective view of one example of an identification system to communicate with a controller.

The row segment 510 and/or the rack segment 108 may have guide connectors 30 placed at designated intervals to connect to guide segments of the guide structure 502, such as guide segments 106, 108, 510, 514, 534, and 540. The guide connectors 310 may have different geometries based on the segments being connected. For example, a guide connector connecting a system module 520 to a rack segment 108 may be different in size than a guide connector connecting the rack segment 108 to row segment 510. Some example geometries are shown in FIG. 6 as guide connectors 614 and 616.

The guide structure may use guide joints 562 to connect certain segments. The guide joints 562 may include a signal blocker 568 to stop a signal from communicating outside of the guide structure 502. The guide joints 562 may include antenna to communicate over the communication paths 555.

A rack 516 may generally comprise the rack segment 108, a rack module 528, and one or more system modules 520. The rack controller 110 may be part of a rack module 528 that interfaces with the rack segment 108 via a proximity connectivity method, guide segment 106 to communicate over the communication path 555, and/or via electrical connector 566 to communicate over the communication interface network 508. The rack controller 110 may manage the guide segments and server systems or devices connected to the rack segment 108 by communicating with system controllers, such as system controllers 220. The rack module 528 may include an identification mechanism 102 that may contain data identifying the rack module 528 or other data associated with the rack 516 and/or 550.

A system module may be anointed as a rack module at installation, by manual selection, car by an anointing method based on the location of the system module. Likewise, a rack module may be anointed as row module at installation, by manual selection, or by an anointing method based on the location of the rack module. For example, a system module nay be designated as a rack module or a row module, by connecting to a bay area with a direct electrical interface connection 566.

Each one of the system modules 520 may have a system controller 220 and an identification mechanism 102. An identification mechanism associated with a system controller 220, such as identification mechanisms 102, may have an identification tag that may include memory to store information, such as system information and/or information similar to the guide segment information discussed above. For example, the memory of identification tag may include a unique identifier, model number, configuration information, etc.

A plurality of reader mechanisms 104 may be coupled to the guide structure 502. As shown in FIG. 5, a plurality of reader mechanisms 104 may be coupled to a rack-level segment, such as rack segment 108. Each of the plurality of reader mechanism 104 may be placed at a designated interval along the exterior or interior of the rack segment 108. Each reader mechanism 104 may designate a system bay area where a system module, such as system module 520, may interface with the reader communication interface network 508. One or more of a plurality of reader mechanisms 104 may read the information provided by an identification mechanism 102 via a proximity connectivity method. The proximity connectivity method may include RFID, NFC, WPAN, or a combination thereof.

The plurality of reader mechanisms 104 may interface with a communication interface network 508. The communication interface network 508 may be an electrical interface, RF interface, or a combination of electrical and RF among the plurality of reader mechanisms 104. For example, the communication interface network 508 may include art RFID interface between the identification mechanism 102 and the reader mechanism 104 and an electrical controller area network ("CAN") bus interface between the reader mechanism 104 and the controller 110. For another example, the communication interface network 508 may have an electrically conductive interface connection 566 between the row segment 510 and the rack segment 108 to extend the communication interface network 508 rather than, or in addition to, communicating across a wireless connection, such as RFID, as depicted in FIG. 5. The communication interface network 508 may contain one or more intermediate controllers 560 to aggregate the signals from the reader mechanisms 104 and interface with destination controllers, such as a rack controller 110 or a row controller 530. The one or more intermediate controllers 560 may manage the communications among the plurality of reader mechanisms 104, including multiplexing. In one example, each one of the plurality of reader mechanisms 104 may include a dedicated connection to the intermediate controller 560 which may handle management of the transmissions and transmit communications to the rack controller 110 accordingly.

A row module 532 may include the row controller 530 that may interface with a rack segment, such as rack segment 534. The row controller 530 may manage the guide segments and systems of racks 516 and 550 connected to the row segment 510 by communicating with rack controllers, such as the rack controllers 110. The row controller 530 may manage the rack modules associated with rack 552, and 550 and/or may manage communications for topology management if the management module 536 is not implemented. The row module 532 may include an identification mechanism 102.

The row controller 530 may maintain a topology of server systems and/or devices connected to the guide structure 502 by making direct requests to system modules 520, propagating requests to the rack controllers 110, and/or maintaining a database, such as a database similar to database 538. The row controller 530 may be dedicated to one row of racks or may maintain the topology of the entirety of the guide structure 502. In another example, the entire topology of the guide structure 502 may be managed by a management module 536. Depending on implementation, the row controller 530 may send requests to other controllers, such as controllers 110 and 220, and may update a database coupled to the row module 530 with information regarding the guide structure 502. For example, the row controller 530 may request information from a system controller 220 by communicating with rack controller 110. The row controller 530 may communicate with a subsystem and/or other components of the system directly and/or by using a similar hierarchical manner of the example above.

The management module 536 may be connected to the guide structure 502 directly, such as a connection similar to connections 310 and 566, and/or via a proximity connectivity method interface as depicted in FIG. 5. The management module 536 may include a database 538, and an identification mechanism 544. The management module 536 may communicate with system modules 520, rack modules 528, and/or the row module 532 and may update the database 538 with the information received from the one or more of the communications with the management module 536. The management module 536 may maintain the database 538 associated with guide structure 502, which may include multiple rows, multiple racks, and multiple systems and provide an interface to request guide segment information or other location information from the database 538. The management module 536 may store a set of data representing guide segment information and a set of data representing system module information in the database 538. The management module 536 may be queried for location and guide information associated with a particular controller or module, such as one of system modules 520.

FIG. 6 is a perspective view of one example of an identification system 600. Referring to FIG. 6, one example identification system 600 may generally comprise a row module 532, a rack module 528, a system module 520, and a support structure 618. The support structure 618 may include a guide structure 502 having multiple segments, such as guide segments 510 and 108, and each segment may include an identification mechanism 102. For example in FIG. 6, the guide structure may be integrated into the support structure 618 and may include row segment 510, rack segment 108, rack guide connectors 614, and system guide connectors 616. Rack guide connectors 614 and system guide connectors 616 may be geometrically distinguished examples of the guide connector 310.

The row segments 510 may be attachable to the ceiling of a data room, a structure for supporting a row segment, or to the support structure 618. The rack segment 108 may be integrated into a support structure 618, as shown in FIG. 6, or attachable to a support structure 618. The support structure 618 for the rack segment 108 may be attachable to the row segment 510, the structure supporting the row segment 510, attached to the ground of the data room, or otherwise supported by a structure associated with the data room. The support structure 618 may be designed to hold modules, systems, subsystems, devices, and/or other components, such as system modules 520, rack modules 528, row modules 532, and manage modules 536. The support structure 618 may be made of a material that provides sufficient strength characteristics to hold server systems, devices, guide segments, and/or other components, such as metal, aluminum, carbon nanotube, or carbon fiber.

The row segments 510 and the rack segments 108 may have a geometry and be made of material capable of propagating a signal and confining electric and/or magnetic fields. For example, segments 510 and 108 may be made of metal and have a rectangular cross-section. The guide segments 510 and 108 may have a uniform cross-section that provides a hollow tube to contain a propagating signal. Alternatively, the guide segments 510 and 108 may house a copper coaxial cable. Rectangular or elliptical cross-sections may be preferable and may be of a size and shape related to the frequency of the signal used in a communication network provided by the guide structure. For example, rectangular wave guides may have a hollow cross-section having an aspect ratio of 0.5 between wall height and wall width of the cross-section.

The rack segment 108 may be sufficiently small to at least partially fit within a support structure 618, such as a server rack. Support structure 618 with rack segment 108 integrated into the structure may have system guide connectors 616 extending from the support structure 618 to allow a system module 520 to communicatively connect to the guide structure inside the support structure 618.

Rack guide connectors 614 and system guide connectors 616 may include end-to-end connections, curved joints, or perpendicular connections between guide segments, such as guide segments 510 and 108. Guide connectors 614 and 616 may provide connections to one or more guide segments. For example, rack guide connector 614 may provide a guide intersection of four guide segments, such as a guide switch. Guide connectors 614 and 616 may provide an adapter or a converter to accept guide segments of different geometries and different communication protocols and/or signal frequencies. Guide segments 510 and 108 and guide connectors 614 and 616 may be commercially available products.

The row module 532 may connect directly to the row guide 510 at a rack guide connector 614 or, as shown in FIG. 6, connect to the support structure 618 at a system guide connector 616 on rack guide segment 108. The row module 532 may have a controller that may communicate with other controllers over the communication network provided by the guide structure within the support structure 618. The controller of the row module 532 may interface with a CAN via an electrical interface connection 566 as depicted in FIG. 6 or over a proximity connectivity method using at least one of a plurality of reader mechanisms 104 and row identification mechanism 554.

The rack module 528 may connect to the rack guide segment 108 at a system guide connector 616. The rack module 528 may have a controller that may communicate with other controllers over the communication network provided by the guide structure within the support structure 618. The controller of the rack module 528 may interface with a CAN via an electrical interface connection or over a proximity connectivity method using at least one of the plurality of reader mechanisms 104 and rack identification mechanism 524.

The system module 520 may connect to the rack guide segment 108 at a system guide connector 616. The system module 520 may have a controller that may communicate with other controllers over the communication network provided by the guide structure within the support structure 618. The controller of the system module 520 may interface with a CAN via an electrical interface connection or over a proximity connectivity method using at least one of the plurality of reader mechanisms 104 and the system identification mechanism 102.

Figure 7:
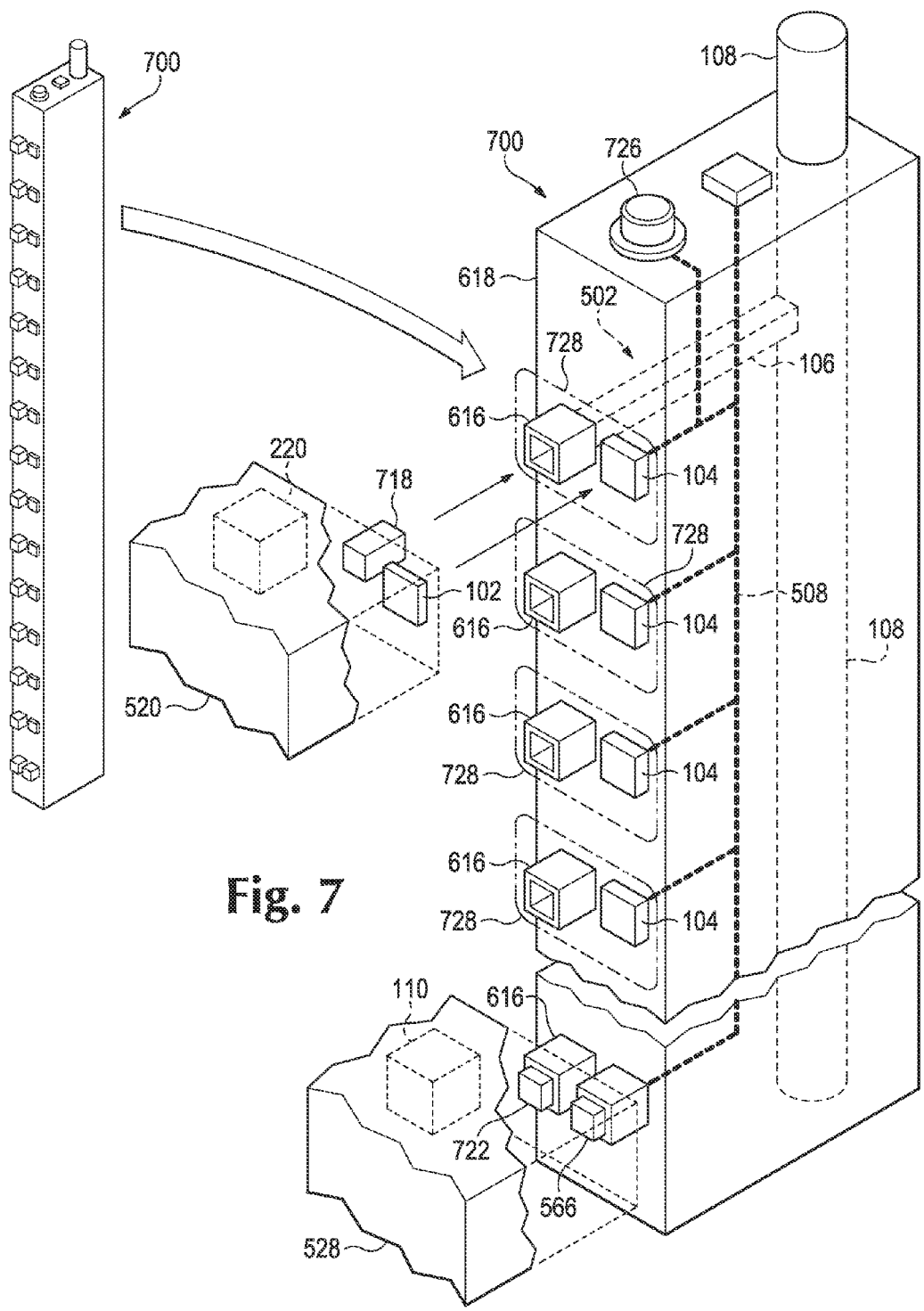
FIG. 7 is an expanded view of a portion of one example of an identification system to communicate with a controller.

FIG. 7 is an expanded perspective view of one example of an identification system 700. Referring to FIG. 7, one example identification system 700 may generally comprise a support structure 618, a plurality of guide connectors 616, a plurality of reader mechanisms 104, a communication interface 508, at least one system module 520, and a rack module 528. A guide structure 502 may be integrated within the support structure 618.

The guide structure 502 may include a rack segment 108, guide segment 106, and the plurality of guide connectors 616. The system module 520 may also include a system segment 718 of the guide structure 502 to interface with at least one of the plurality of guide connectors 616. The system segment 718 may be a connector to interface with one of the plurality of guide connectors 616 or may be a system level guide segment that may extend to other system level guide segments, subsystems or components or subsystem level guide segments. Subsystems may have radio frequency transceivers and antenna to interface with the guide segments and communicate over the communication network provided by the guide structure 502.

The plurality of reader mechanisms 104 may be coupled to the exterior of the support structure 618. The plurality of reader mechanisms 104 may be placed at designated intervals along the support structure 618 and/or near the plurality of guide connectors 616. Bay areas 728 of support structure 618 for connecting system modules to the rack segment 108 may be designated by each one of the plurality of guide connectors 616 or a combination of one of the plurality of reader mechanisms 104 and one of the plurality of guide interfaces 616.

The plurality of reader mechanisms 104 may be communicatively coupled to the communication interface network 508. The communication interface network 508 may be an electrically conductive network for communication between each of the plurality of reader mechanisms 104 and a rack controller 110. The communication interface network 508 may include a network for communication with controllers, such as a CAN bus or antenna multiplexer network. The communication interface 508 may allow for reading a transmission on another guide segment through a reader mechanism connected to the other guide segment. For example, a rack controller may read an adjacent row guide segment using the reader mechanism in communication with the identification mechanism of the row guide segment or over a direct electrical connection, such as interface connection 566 in FIG. 5, to communication interface network 508.

The system module 520 may include a system controller 220 and an identification mechanism 102. The identification mechanism 102 may include an identification tag and/or a storage medium to contain a set of system data and/or a set of guide data. The identification mechanism 102 may be positioned on the system module 520 in range of one of the plurality of reader mechanisms 104 based on a proximity connectivity method. At least one of the plurality of reader mechanisms 104 may be configured to read the set of system data and/or the set of system guide data of identification mechanism 102 upon request from a controller module, such as in a rack module 528. The data read by the reader mechanism 104 may be communicated over communication interface network 508 to a controller such as a rack controller 110 of the rack module 528, or a tag reader interface controller, such as one of the intermediate controllers 560 depicted in FIG. 5.

The rack module 528 may include a rack guide interface 722 to connect to the rack segment 108. The rack controller 110 may be in communication with a communication interface connector 566 to connect the rack controller 110 to communication interface network 508.

A selector mechanism 726 may be coupled to the support structure 618 and/or the rack segment 108. The selector mechanism 726 may be connected to at least one of the plurality of reader mechanisms 104. The selector mechanism 726 may be in communication with one or more identification mechanisms 102, the communication interface network 508, and/or one or lore controllers, such as controllers 110 and 220, to associate one or more identifiers to the set of guide data contained by e identification mechanism 102. The selector mechanism 726 may provide at least one of a group identifier, a guide sequence number, and other information to uniquely identify the guide segments, such as guide segment 106. For example, the selector mechanism 726 may provide a unique group identifier number for the rack controller 110 to use as a prefix or a postfix, modifying the identifiers read from one or more of the identification mechanisms 102 by the rack controller 110. The rack controller 110 may write the modified identifiers to the identification mechanisms 102 in the system modules 520 and the row segments 562 via the communication interface network 508. The physical location of a reader mechanism 104 in a rack may be known by the rack controller 110, which serves as the guide sequence number. A group identifier may identify which guide segments of the guide structure 502 are associated with a support structure 618 and a guide sequence number may identify the location where a system module 520 is interfaced with the support structure 518 and/or guide segment 108.

The selector mechanism 726 may be set manually, automatically, or dynamically by hand, by computer, or by some other mechanism. For example, the selector mechanism 726 may include a dial that may be manually rotated to establish the group identifier. For another example, the selector mechanism 726 may include a module having a combination of hardware and programming to set the group identifier remotely via a computer or dynamically as desired. The system modules 520 may be at least partially identifiable by location using the group identifier and/or the guide sequence number. The identifiers may be set at installation of the rack structure, before installation, or after installation.

The selector mechanism 726 may be configured to set other data of the guide segments, such as a guide sequence number to differentiate between connections to the guide segment 108. The guide sequence number may designate a number or other identification with each bay area 728 of the support structure 618. The guide sequence number, group identifier, and/or other guide segment data may represent all or part of a communication path and/or a location of the system modules 520 connected at each bay area 728. This information may be used to maintain a topology of the system modules, rack modules, row modules, and/or guide segments, such as modules 520 and 528 and guide segments 106 and 108 within a row, rack, or entirety of the guide structure.

FIGS. 8 and 9 are flow diagrams of examples of identification methods for maintaining a topology of a plurality of controllers. In discussing FIGS. 8 and 9, reference may be made to elements and diagrams of FIGS. 1-7 to provide contextual examples. Implementation, however, is not limited to those examples.

In step 802 of FIG. 8, a system module may be discovered. The system module may be in communication with the guide structure via a proximity connectivity method. For example, the system module may be discovered when the system module comes into a range determined by a proximity connectivity method and/or couples to a guide interface on a guide structure. The system module may be discovered via proximity connectivity method by a reader mechanism coupled to the guide structure. The system module may include a system controller and a system identification tag containing a set of system data.

In step 804, the set of system data may be received via proximity connectivity method. The reader mechanism may be coupled to the guide structure and may read the system identification tag information to receive the set of system data contained on the identification tag. The reader mechanism may be configured to read the data contained on t the system identification tag in an active and/or passive mode.

In step 806, a set of guide segment data may be associated with the system con roller based on a communication path through the guide structure. The set of guide segment data may be retrievable via a proximity connectivity method from a guide identification tag coupled to a guide segment of the guide structure. The rack controller may request to read the guide segment data from the guide identification tag via a reader mechanism in communication with the guide identification tag.

In step 808, a configuration message including the set of guide segment data may be sent to the system controller based on the set of system data. The rack controller may obtain a set of communication path data by requesting to read the set of guide data from each guide identification tag on the communication path to the system module. The configuration message may contain the communication path data and each set of guide data associated with the guide segments in the communication path. The rack controller may add the guide selector data to the identification data collected from the identifier mechanism as a set of unique location information for the system module and the guide segments. Inc system module may store the system data and guide data. Another module, such as a rack module, row module, or a management module may store the data as well. Information may be requested from the system module for communication, transport, or replacement by providing the location and/or guide segments along the communication path to the system module.

The description of steps 802, 804, 806, and 808 may be applied to 904, 906, 908, and 910, respectively.

In step 902 of FIG. 9, a controller, such as a rack controller, may periodically query at least a portion of the guide structure for a system controller. The query may initiate a discovery request, such as step 904, at each reader mechanism reached by the query request. For example, the row controller may send out a query message to rack controllers via the communication interface between controllers and reader mechanisms to broadcast a query to all or some of the possibly installed system controllers.

In step 912, the row controller may multicast a discovery confirmation message to a plurality of controllers to request a set of identification data from each one of the plurality of controllers based on a configuration identifier. In one example, the row controller may broadcast a discover confirmation message to other row controllers. Each row controller may broadcast the discovery confirmation message to each of the rack controllers connected to the row segment associated with the row controller. Each rack controller may broadcast the discover confirmation message to each of the system controllers connected to the guide segment. Discovery confirmation messages may be sent to a specific group of the plurality of controllers based on an identifier, such as a group identifier.

The set of identification data of the discover confirmation message may include a set of guide segment data, a set of system data, location data and/or a set of communication path data. The discovery confirmation message may be sent when the rack controller has received at least one set of guide data, location data, and/or communication path data. The discovery confirmation message may be sent to one system module, sent each module for which the rack controller received a set of guide data and/or communication path data, or broadcasted to all modules. A system module that receives a discovery confirmation message with incorrect data may discard the message or send a response to the rack controller to request discovery.

In step 914, a controller may request to update a management module with the set of guide segment data and the set of system data. The request may be sent from the system controller, rack controller, row controller, or any other controller configured to send management data to the management module. The management module may collect the set of guide segment data and e of system data and update the database of the management module. The database may include communication path data, guide segment data, and/or location data of each system module that has been discovered and responded to the management controller requests. The information maintained by the management module may represent a topology of controllers and/or guide segments. The topology may provide for searching for a module or a guide location.

Guide segment data may be any set of data associated with one or more guide segments of the guide structure. System data may be any set of data associated with a system module. Location data may be any set of data to refer to the specific location of the system module, such as global position coordinates or a guide sequence number. Communication path data may be any set of data associated with a communication path within the guide structure. The sets of data discussed above and/or other data collected by the management module may overlap in category.

Although the flow diagrams of FIGS. 8 and 9 illustrate specific orders of execution, the order of execution may differ from that which is illustrated. For example, the order of execution f the blocks may be scrambled relative to the order shown. Also, the blocks shown in succession may be executed concurrently or with partial concurrence. All such variations are within the scope of the present invention.

Wherever the present description discusses a controller and regardless of whether the controller is managing a system, rack, row, tag, or other component, the discussion lay be applied to a redundant controller. In addition, controllers and modules may be connected to multiple guide segments and may have multiple communication paths to the controller or module.

Wherever the present description discusses a signal or transmission using radio frequency, the radio frequency signal or transmission may comply with any radio frequency communication protocol(s) and/or any wireless communication standard(s). For example, a wireless communication standard may be any one of the following standards: WI-FI specification of IEEE 802.11b/g/a/n operating at 2.4 GHz or 5 GHz bands; WIGIG specification of IEEE 802.11ad operating at 2.4 GHz, 5 GHz, or 60 GHz bands; and WIMAX specification of IEEE 802.16e operating between 10 GHz and 66 GHz bands.

The present description has been shown and described with reference to the foregoing examples. It is understood, however, that other forms, details, and examples may be made without departing from the spirit and scope of the invention that is defined in the following claims.

What is claimed is:

1. An identification apparatus to communicate with a controller comprising:
   a first guide segment, associated with a system module of a computing server rack, to guide a signal;
   a second guide segment, associated with a rack segment of the computing server rack and coupled to the first guide segment, the second guide segment to guide the signal;
   a guide connector located between the first guide segment and the second guide segment to provide blind-mating;
   an identification mechanism coupled to the first guide segment, the identification mechanism including an identification tag to contain a set of data; and
   a reader mechanism coupled to the second guide segment, the reader mechanism to receive the set of data via a proximity connectivity method and communicate the set of data to the controller.

2. The identification apparatus of claim 1, further comprising a write mechanism coupled to the identification mechanism to update the set of data based on a transmission from at least one of the reader mechanism and the controller.

3. The identification apparatus of claim 1, comprising:
   a second identification mechanism coupled to the second guide segment, the second identification mechanism including a second identification tag to contain a second set of data; and
   a second reader mechanism coupled to the first guide segment, the second reader mechanism to receive the second set of data by the proximity connectivity method.

4. The identification apparatus of claim 1 wherein the proximity connectivity method comprises one of a radio frequency identification method, a wireless personal area network method, or a near field communication method.

5. An identification system to communicate with a controller comprising:
   a guide structure to guide a signal via a communication path, the guide structure including a first guide segment associated with a system module of a computing server rack, a second guide segment associated with a rack segment of the computing server rack, and a guide segment connector located between the first and second guide segments to provide blind-mating to the first and the second guide segments;
   a guide identification mechanism coupled to the first segment, the guide identification mechanism including a guide identification tag to contain a set of guide data;
   a plurality of reader mechanisms coupled to the second guide segment, one of the reader mechanisms to receive the set of guide data via a proximity connectivity method; and
   a communication interface network coupled to the plurality of reader mechanisms, the controller to interface with the communication interface network to receive the set of guide data.

6. The identification system of claim 5, wherein each one of the plurality of reader mechanisms is coupled to the second guide segment at a designated interval substantially along a linear path of the exterior of the second guide segment.

7. The identification system of claim 5, comprising an electrically conductive connection among the plurality of reader mechanisms.

8. The identification system of claim 5, comprising a selector mechanism in communication with the plurality of reader mechanisms, the selector mechanism to communicate at least one of a group identifier and a guide sequence number to at least one of the identification mechanism, the communication interface network, and the controller.

9. The identification system of claim 5, wherein at least part of the guide structure is integrated into a support structure.

10. The identification system of claim 5, comprising the system module including:
    a system identification mechanism coupled to the system module, the system identification mechanism including a system identification tag to contain a set of system data and
    the one of the plurality of reader mechanisms to receive the set of system data via the proximity connectivity method.

11. The identification system of claim 10, comprising a management module in communication with the system module to associate the guide data with the system module, the management module including a database to receive the guide data and the set of system data.

12. An identification method for maintaining a topology of a plurality of system modules of a computing server rack comprising:
    discovering one of the plurality of system modules of the computing server rack in communication with a guide structure via a proximity connectivity method, the one of the plurality of system modules including a system controller and a system identification tag containing a set of system data, wherein the guide structure includes a guide segment connector providing blind-mating to a first guide segment and a second guide segment;
    receiving the set of system data via a proximity connectivity method;
    associating a set of guide segment data with the system controller based on a communication path through the guide structure, the set of guide segment data retrievable via the proximity connectivity method from a guide identification tag coupled to a guide segment of the guide structure; and
    sending a configuration message to the system controller based on the set of system data, the configuration message including the set of guide segment data.

13. The identification method of claim 12, further comprising periodically querying at least a portion of the guide structure for the system controller.

14. The identification method of claim 12, further comprising multicasting a discovery confirmation message to a plurality of controllers to request a set of identification data from each one of the plurality of controllers based on a configuration identifier, the set of identification data to include the set of guide segment data.

15. The identification method of claim 12, further comprising updating a management module with the set of guide segment data and the set of system data.

* * * * *